United States Patent
Baker et al.

(10) Patent No.: US 6,405,172 B1
(45) Date of Patent: Jun. 11, 2002

(54) VOICE-ENABLED DIRECTORY LOOK-UP BASED ON RECOGNIZED SPOKEN INITIAL CHARACTERS

(75) Inventors: Christopher A. Baker, West Lafayette; Peter N. Baker, Lafayette; Cortland D. Starrett, Brookston; Alexander R. Moon; Jia Xu, both of West Lafayette; Eric R. Auberry, Lafayette, all of IN (US)

(73) Assignee: MailCode Inc., Lafayette, IN (US)

( * ) Notice: Subject to any disclaimer, the term of this patent is extended or adjusted under 35 U.S.C. 154(b) by 26 days.

(21) Appl. No.: 09/659,383

(22) Filed: Sep. 9, 2000

(51) Int. Cl.[7] .......................... G10L 15/22; G06F 17/30
(52) U.S. Cl. ........................... 704/270; 704/254; 707/5
(58) Field of Search ................................ 704/254, 270; 707/5

(56) References Cited

U.S. PATENT DOCUMENTS

| | | | |
|---|---|---|---|
| 4,276,597 A | * 6/1981 | Dissly et al. ................... | 707/1 |
| 4,453,217 A | * 6/1984 | Boivie ........................... | 707/5 |
| 4,556,944 A | 12/1985 | Daniels et al. | |
| 4,632,252 A | 12/1986 | Haruki et al. | |
| 4,866,778 A | 9/1989 | Baker | |
| 4,908,864 A | 3/1990 | Togawa et al. | |
| 4,921,107 A | 5/1990 | Hofer | |
| 4,979,206 A | * 12/1990 | Padden et al. ........... | 379/88.01 |
| 5,101,375 A | 3/1992 | Goldhor | |
| 5,212,730 A | 5/1993 | Wheatley et al. | |
| 5,263,118 A | 11/1993 | Cornelison | |
| 5,353,221 A | 10/1994 | Kutsumi et al. | |
| 5,454,063 A | * 9/1995 | Rossides ..................... | 704/275 |
| 5,500,920 A | 3/1996 | Kupiec | |
| 5,581,599 A | * 12/1996 | Tsuji et al. ................. | 455/415 |
| 5,677,834 A | 10/1997 | Mooneyham | |
| 5,677,990 A | * 10/1997 | Junqua ....................... | 704/255 |

(List continued on next page.)

FOREIGN PATENT DOCUMENTS

| | | | | |
|---|---|---|---|---|
| EP | 876036 A2 | * 11/1998 | .......... | H04M/1/274 |
| WO | 99/09729 A1 | * 2/1999 | .......... | H04M/1/274 |

Primary Examiner—Tālivaldis Ivars Šmits
(74) Attorney, Agent, or Firm—Alberta A. Vitale; Charles R. Malandra; Angelo N. Chaclas

(57) ABSTRACT

A novel voice-enabled directory look-up system is disclosed. In one embodiment, an operator reads the first few characters from each of the first and last names of a mail addressee. The system captures the speech as an audio signal, which is parsed into character position segments. The system determines one or more candidate characters that might have resulted in the audio signal for each character position segment. The system then expands the list of candidate characters for at least one character position to include one or more characters that sound like the original candidate characters for that character position. The candidate characters for the respective character positions are composed into a regular expression, which is applied using an inexact string matching look-up routine to a directory of records. Records with the best matches are returned in a menu for the operator. The operator selects the desired record from the menu.

In another embodiment, an operator reads aloud the thousands and hundreds digits of the street number and the first three letters of the street name from a mail piece. A voice engine parses and decodes the speech into candidate characters for each character position. The system selects alternative characters that sound similar to candidate characters in a given character position. An inexact string matching routine retrieves records from a carrier route directory that match either a candidate character or an alternative character in each position of each data field.

1 Claim, 3 Drawing Sheets

U.S. PATENT DOCUMENTS

| | | | |
|---|---|---|---|
| 5,752,195 A | * | 5/1998 | Tsuji et al. .................. 455/462 |
| 5,752,230 A | * | 5/1998 | Alonso-Cedo .............. 704/270 |
| 5,905,773 A | * | 5/1999 | Wong ...................... 379/88.03 |
| 5,987,410 A | | 11/1999 | Kellner et al. |
| 5,995,928 A | | 11/1999 | Nguyen et al. |
| 6,009,392 A | | 12/1999 | Kanevsky et al. |
| 6,032,164 A | | 2/2000 | Tsai |
| 6,052,439 A | | 4/2000 | Gerszberg et al. |
| 6,317,489 B1 | * | 11/2001 | Parsadayan ............ 379/102.06 |

* cited by examiner

VOICE-ENABLED DIRECTORY LOOK-UP BASED ON RECOGNIZED SPOKEN INITIAL CHARACTERS

BACKGROUND OF THE INVENTION

The present invention relates generally to voice speech recognition, and more particularly, but not exclusively, to the retrieval of records from a directory using spoken characters.

Certain modern data retrieval systems use voice speech recognition technology to select a desired record from among many. These systems, however, fail to perform adequately in certain circumstances, such as in the recognition of certain characters that sound similar when spoken. Such failures severely limit the utility of these systems for many operators and in many applications.

Other systems fail to correctly retrieve records when one or more characters are missing or incorrectly interpreted. Again, such systems are of limited utility in many applications and for many operators.

It is, therefore, apparent that a need exists for improved systems that apply voice speech recognition technology to large-directory look-up situations.

SUMMARY OF THE INVENTION

It is an object of this invention to provide an improved system for retrieving records from a directory using spoken characters as input.

It is another object of this invention to provide an improved table look-up system for contexts in which operators speech patterns are inconsistent, or the prefix letters that are read by the operator are not clearly legible.

These objects and others are provided in a system, method, and apparatus that retrieve data from a directory based on the spoken initial characters of one or more fields. Substitution groups are established, each containing characters that sound alike when spoken. For each query, an operator speaks the first few characters of the one or more fields. The characters are parsed and decoded from the speech, thereby producing a set of candidate decodings for each character position. Then, for at least one character position, one or more alternative characters (from the same substitution group(s) as the candidate character(s) for that character position) are selected to broaden the search. In some such embodiments, a regular expression is created that, for each character position output by the voice engine, matches (1) any of the candidate characters presented by the voice engine, or (2) any alternative character that is in a substitution group within one or more of the decoded characters. The regular expression is processed by an inexact string matching look-up routine and applied to the directory. The best matches are presented to the operator, who selects the desired record.

Other embodiments, forms, variations, objects, features, and applications may appear to those skilled in the art from the drawings and description contained herein.

DESCRIPTION OF SELECTED EMBODIMENTS

Figure 1:
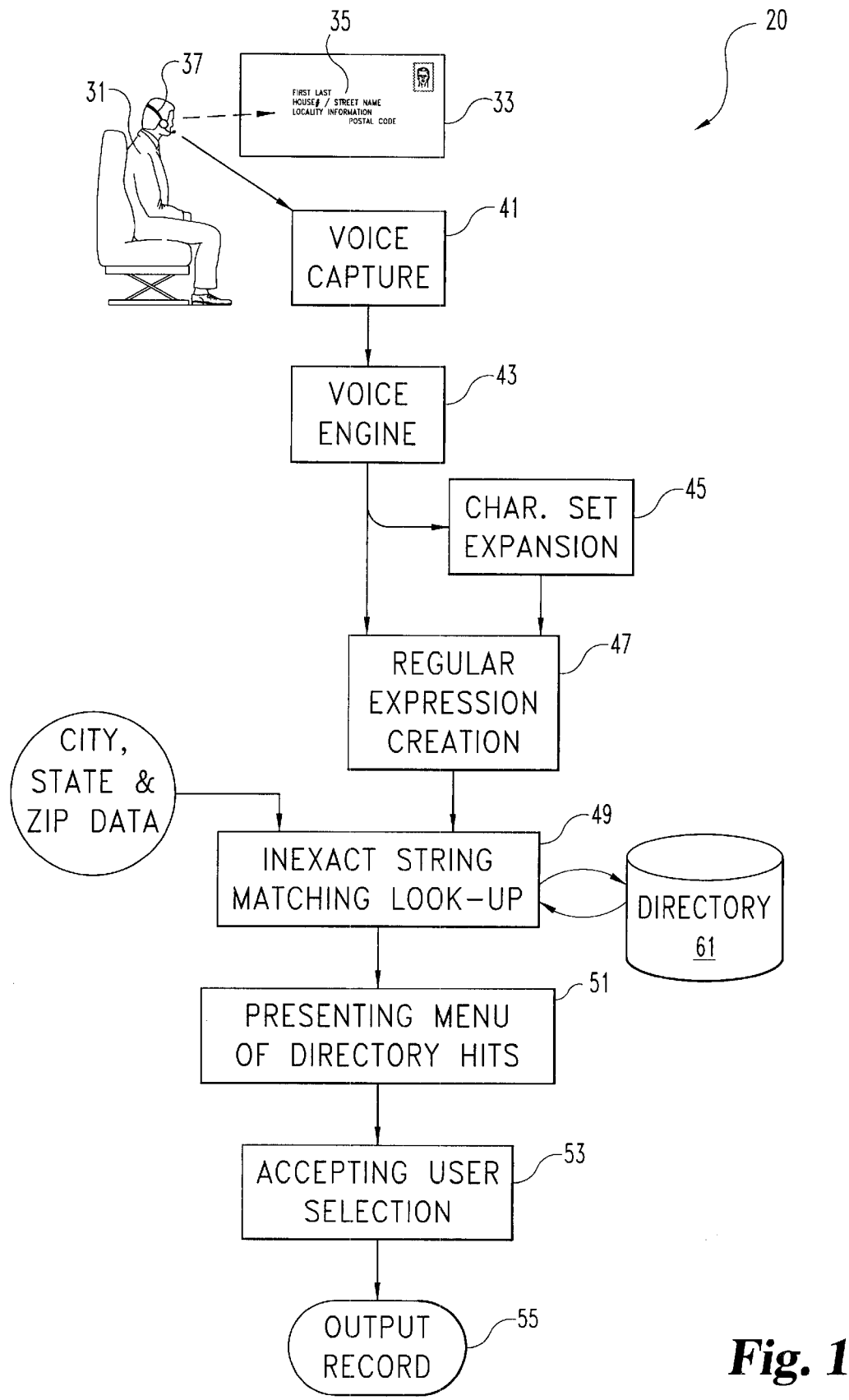
FIG. 1 shows a block diagram of a voice-enabled look-up system.

For the purpose of promoting an understanding of the principles of the invention, reference will now be made to the embodiments. illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally speaking, FIG. 1 shows a voice-enabled look-up system wherein a postal employee prepares a mail piece for automated processing. The operator reads at least the first few characters of the street number and name. The speech is parsed into letters and decoded by a voice engine. A regular expression is created using the characters so decoded and possible substitutes that sound similar to those selected by the voice engine. The regular expression is applied to the directory to retrieve a set of records, each of which contains an address that matches the regular expression. The set of records is presented to the operator as a list from which to select the address that actually appears on the mail piece. A bar code reflecting the proper sorting data (e.g., carrier route and ZIP+4 data) for the mail piece may then be applied to it.

Figure 2:
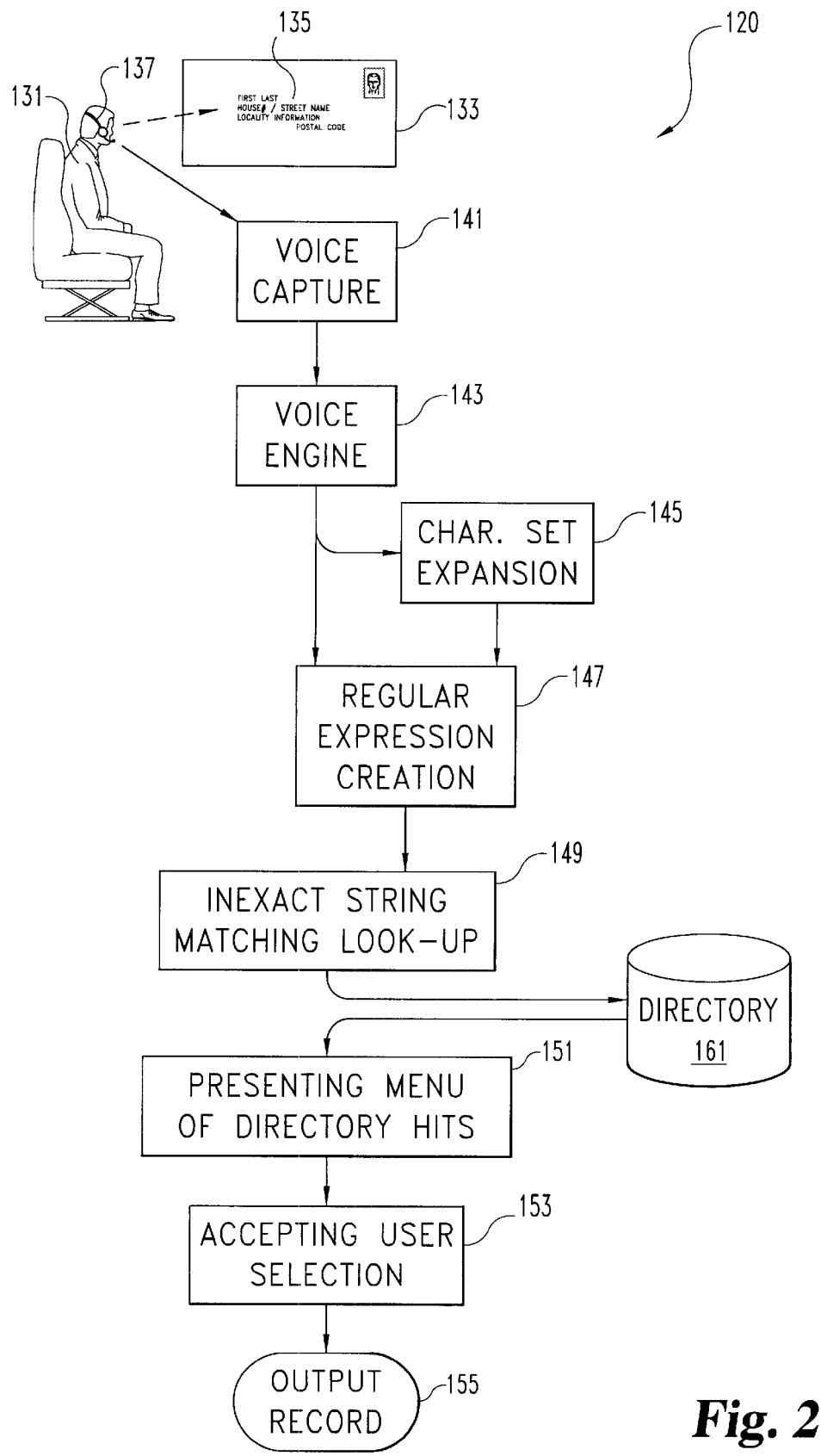
FIG. 2 shows a block diagram of another voice-enabled look-up system

FIG. 2 shows an alternative application of this voice-enabled look-up technology. In this embodiment, mail arrives in an organization's mail room. An operator reads the first few characters of the addressees' first and last names, and the system returns the addressees' mail stop, department, and/or other directory information. The mail piece is then routed to the addressee using that mail stop information.

In the illustrated embodiments, reference will be made to functional units and modules. It will be apparent to those skilled in the art that, in other embodiments within the scope of the present invention, these units and modules may be implemented in hardware, software, or a combination thereof. Furthermore, a variety of network topologies, directory table and storage structures, and query languages and schemes may be used as appropriate for a particular implementation of the present invention and would occur to one skilled in the art.

Turning now to FIG. 1, system 20 will now be described in more detail. Operator 31 examines the mail piece 33 and speaks part (preferably the thousands and hundreds digits) of the street number, then part (preferably the first three characters) of the street name from address 35 into headset 37. The spoken characters are captured by voice capture unit 41 and stored as a digitized audio signal. That signal is sent by voice capture unit 41 to voice engine 43. Voice engine 43 uses any suitable method to parse the digital audio signal into segments, each associated with a spoken character. Each segment is translated, using any suitable method, by voice engine 43 into one or more candidate characters that may have been spoken, each preferably with an associated confidence level. This operation is preferably, but not necessarily, constrained to a predetermined grammar, so that each character is decoded from a limited set of possible characters based on context and/or a predetermined pattern of characters (e.g., two numeric characters, then between one and four alphabetic characters). In many embodiments, such constraint dramatically improves the accuracy of parsing and decoding by voice engine 43.

The candidate characters (and the associated confidence levels, if any) produced by voice engine 43 are sent to character set expansion module 45 and regular expression creation module 47. For each character position of data produced by voice engine 43, character set expansion module 45 examines the one or more candidate characters received from voice engine 43, and identifies potential alternative decodings. This identification may use predetermined groups of characters, each of which sound similar to the candidate character when spoken. Character set expansion module 45 may also assign a confidence level to each alternative candidate character that it produces. The selection of candidate characters and/or confidence levels may be made using any method that would occur to one skilled in the art, such as by application of linguistic spelling or syntactical rules.

Regular expression creation module 47 takes the candidate characters (and confidence level data, if available) from voice engine 43 and character set expansion module 45 to form a regular expression that describes all possible matches for the spoken street number, and another regular expression that describes all possible matches for the street name. In each case, the regular expression will match all records that contain either the candidate character (from voice engine 43) or alternative candidate character (from expansion module 45) for a given character position.

The regular expression created by module 47 is passed to an inexact string matching look-up module 49. String matching module 49 also receives city, state, and ZIP data for mail piece 33 from a suitable source (e.g., an OCR module or database (not shown)) and prepares a query designed to retrieve all records in address directory 61 that have street numbers and names that match the regular expressions provided by module 47, and also match the given city, state, and ZIP code of address 35. Alternatively, all mail pieces to which the present system is applied in a particular batch or at a particular location are assumed to be destined for a particular geographical area, so directory 61 may be limited to addresses in that area.

The record set produced in response to that query is sent to presentation module 51, which presents a menu of the directory hits to user 31. This menu preferably presents the possible matches in descending order of probability, given the confidence levels produced by voice engine 43 (and character set expansion module 45, if produced). The candidate record associated with the highest level of confidence is preferably presented as a default option that is most easily selected by user 31. The user's selection is made using any suitable means, and is accepted by module 53. The selected record is provided as an output of the process at end point 55. Data from the selected record may, for example, be used to print on the mail piece 33 a bar code including ZIP+4 and carrier route data for improved routing, sorting, and delivery.

Many variations on this system will occur to those skilled in the art. For example, the records searched by string matching module 49 may be limited to those records in directory 61 that match partial street address information obtained from an upstream OCR process.

In other embodiments, information from the output record at end point 55 is used, but no bar code is applied to mail piece 33.

In still other embodiments, enough information from each record is presented by presentation module 51 to obviate the need for a user to select a record at all. In such embodiments, operator 31 simply uses the desired information from the menu (e.g., sorts the mail piece 33 into a particular carrier route order) and proceeds to process the next piece.

It will be apparent to those skilled in the art that the number and position of characters to be read may be varied widely depending upon the particular context of the implementation. Typically the time required to speak more characters (and/or characters from additional fields) must be weighed against the additional narrowing of the output list to be achieved using the additional information.

Directory 61 is preferably optimized with respect to the voice engine to reduce the number of records displayed by presentation module 51. For example adjacent (as in consecutive blocks of the same street) or interwoven (as in odd and even numbers along the same street) address ranges may be combined into one record.

An alternative application will now be described with reference to FIG. 2. This embodiment is implemented in an organization's mail room, where some mail pieces arrive (from internal or external sources) bearing the name of an intended recipient within the organization. A system according to the present invention is used to retrieve that additional destination information to assist in routing and delivery of the mail piece.

In this embodiment, mail piece 133 bears address 135, which includes a first and last name. Operator 131 visually examines mail piece 133 to find address block 135, then speaks into headset 137 the first three letters each of the first name and last name of the addressee. That speech is captured by voice capture unit 141 and translated into a digitized audio signal. Voice engine 143, character set expansion module 145, and regular expression creation module 147 each operate analogously to the corresponding components (voice engine 43, expansion module 45, and regular expression creation module 47) discussed above in relation to FIG. 1.

Like analogous module 49, inexact string matching look-up module 149 uses the regular expression output of regular expression creation module 147 to search directory 161. In this embodiment, the result of the query is returned directly to menu presentation module 151, which provides operator 131 with a menu of the most likely matches from the directory 161. Selection acceptance module 153 of system 120 accepts the user's selection from the menu and outputs the selected record at point 155.

In this embodiment, the department or mail stop associated with the selected addressee is displayed on a video monitor so that operator 131 can write that information directly on mail piece 133 or manually sort mail piece 133 based on the displayed information. Alternatively, mail piece 133 may be imprinted with a bar code or other suitable designator to facilitate automatic or semi-automatic routing and transport through the organization.

It will be seen by those skilled in the art that systems according to the present invention may be implemented efficiently in conjunction with systems that use optical character recognition. For example, system 120 might be applied only to those mail pieces bearing addresses (or addressees) that could not be properly routed solely by the OCR system module.

Systems 20 and 120 might also be used with identifier-related (e.g., bar coding) systems by using the output record (at points 55 and 155, respectively) and printing the identifier for routing using means well known in the art.

It will also occur to one skilled in the art that various forms of menuing and selection may be used by modules 51, 151, 53, and 153. For example, standard graphical user interface (GUI) elements of the WINDOWS®operating systems (published by Microsoft Corporation, One Microsoft Way, Redmond, Wash., USA) may display the list of hits in a dialog box. The user 31, 131 can then execute one or more gestures with a "mouse" pointing device to select the desired entry. Another alternative is to present the list of directory hits, each with an associated symbol so that the user 31, 131 can press a single key on a keyboard to select the desired record. In some embodiments, the default (highest-confidence) hit is automatically selected if a predetermined amount of time passes without an operator selection. The final selection by operator 31 (if required) can also be made using voice engine 43 itself, e.g., by saying "select 1" or by similar method.

Voice engine 43, 143 is preferably an off-the-shelf voice engine product such as a Dragon Systems product published by Lernout & Hauspie, 52 Third Avenue, Burlington, Mass., USA (world headquarters at Lernout & Hauspie Speech Products N.V., Flanders Languages Valley, 50, 8900 Ieper, Belgium), but may be any routine that interprets audio signals to provide one or more candidate characters of output based on voice decoding of the audio signal.

Figure 3:
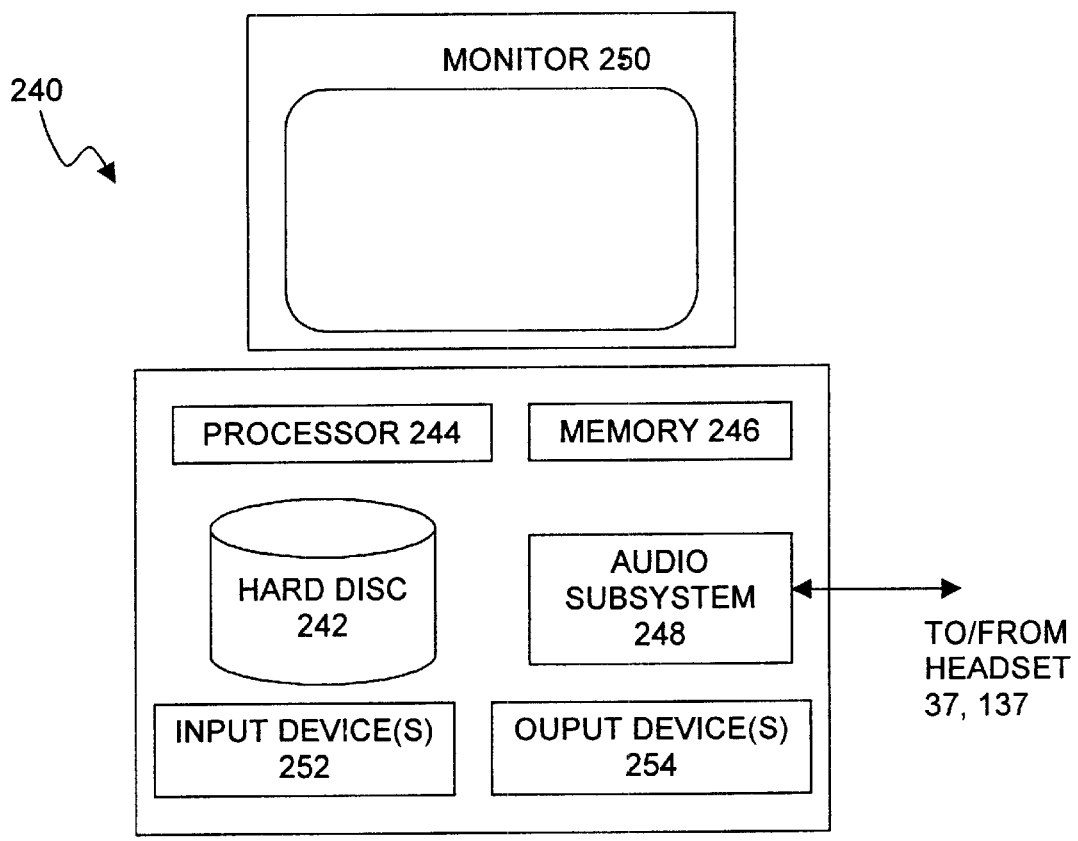
FIG. 3 shows a workstation suitable for use in the systems of FIGS. 1 and 2.

The workstation used by operators 31, 131 will now be discussed in relation to FIG. 3. In this example embodiment, the various hardware and software components that implement the above systems are combined in workstation 240. The software programs and modules described above are encoded on hard disc 242 for execution by processor 244. Workstation 240 may include more than one processor or CPU and more than one type of memory 246, where memory 246 is representative of one or more types. Furthermore, it should be understood that while one workstation 240 is illustrated, more workstations may be utilized in alternative embodiments. Processor 244 may be comprised of one or more components configured as a single unit. Alternatively, when of a multi-component form, processor 244 may have one or more components located remotely relative to the others. One or more components of processor 244 may be of the electronic variety defining digital circuitry, analog circuitry, or both. In one embodiment, processor 244 is of a conventional, integrated circuit microprocessor arrangement, such as one or more PENTIUM II or PENTIUM III processors supplied by INTEL Corporation of 2200 Mission College Boulevard, Santa Clara, Calif., 95052, USA.

Memory 246 may include one or more types of solid-state electronic memory, magnetic memory, or optical memory, just to name a few. By way of non-limiting example, memory 246 may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, memory 246 may be volatile, nonvolatile, or a hybrid combination of volatile and nonvolatile varieties.

Audio subsystem 248 provides an interface between workstation 240 and the audio equipment used by operator 31, 131, such as headset 37, 137. Monitor 250 provides visual output from workstation 250 to operator 31, 131. Additional input device(s) 252 and output device(s) 254 provide interfaces with other computing and/or human entities. Further, audio subsystem 248, headset 37, 137, and workstation 240 may include additional and/or alternative components as would occur to one skilled in the art.

Furthermore, in various embodiments of the invention, the signals acquired by voice capture units 41, 141 may be stored and processed in digital and/or analog form.

In some embodiments, the number of characters to be spoken in a particular context is predetermined. This additional a priori information will often allow the voice engine 43, 143 more accurately to parse and decode the captured audio signal. In other embodiments, feedback paths are introduced so that the voice engine 43, 143 "learns" to better decode the speech of a particular operator 31, 131 or set of operators over time.

In yet other embodiments, a similar process to those described above is applied to multiple fields of an address (e.g., ZIP code, street number, street name, directional modifiers, and/or apartment or suite number) to determine a correct, legal address for the recipient. The output record is then used to apply a complete bar code to the mail piece using means and for purposes well known in the art.

The present invention might also be applied in other directory look-up contexts. For example, accuracy and recognition in an automated telephone directory assistance system might be improved by implementing the present invention therein. In such a system, the user might select a state, then a city, then a listing. At one or more of the selection steps, the user speaks the first few characters of the data item, and the system presents a list of candidate entries. The user selects the desired entry (in response to the list presented by the system) by pressing a key on the telephone keypad.

Modifications of the present disclosure and claims, as would occur to one skilled in the art, may be made within the scope of the present invention. While the disclosure above has been made in relation to preferred embodiments, the scope of the invention is defined by the claims appended hereto.

What is claimed is:

1. A method, comprising:

capturing an audio signal representative of a plurality of spoken characters, each having a character position in one of at least two different data items;

parsing the audio signal into audio segments, each audio segment representing a character position;

decoding each audio segment into one or more candidate characters for the corresponding character position;

retrieving all directory records that contain, in a predetermined data field:

in at least one character position, either (a) one of the candidate characters, or (b) one or more substitution characters, where each substitution character is selected as a function of at least one of the candidate characters; and in each remaining character position for which candidate characters were decoded, one of the candidate characters; and presenting the matching records to an operator.

\* \* \* \* \*